United States Patent Office 3,006,734
Patented Oct. 31, 1961

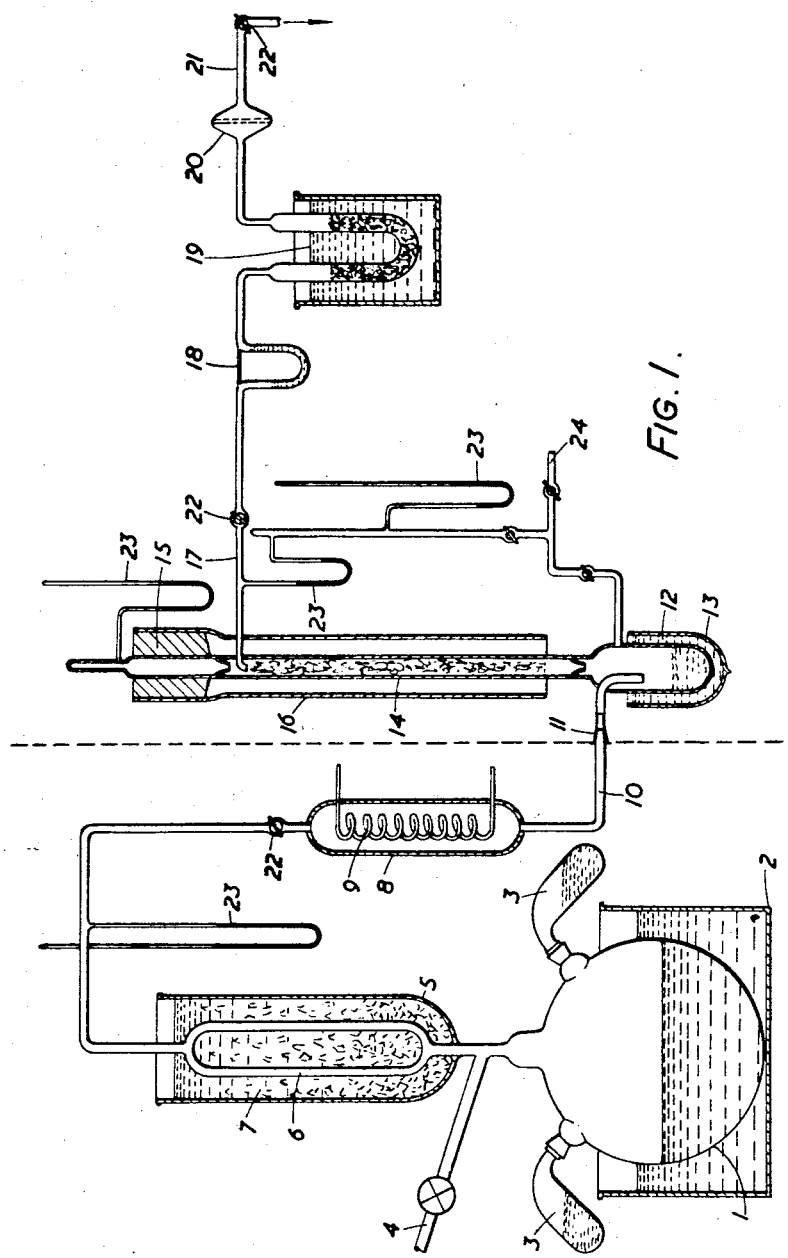

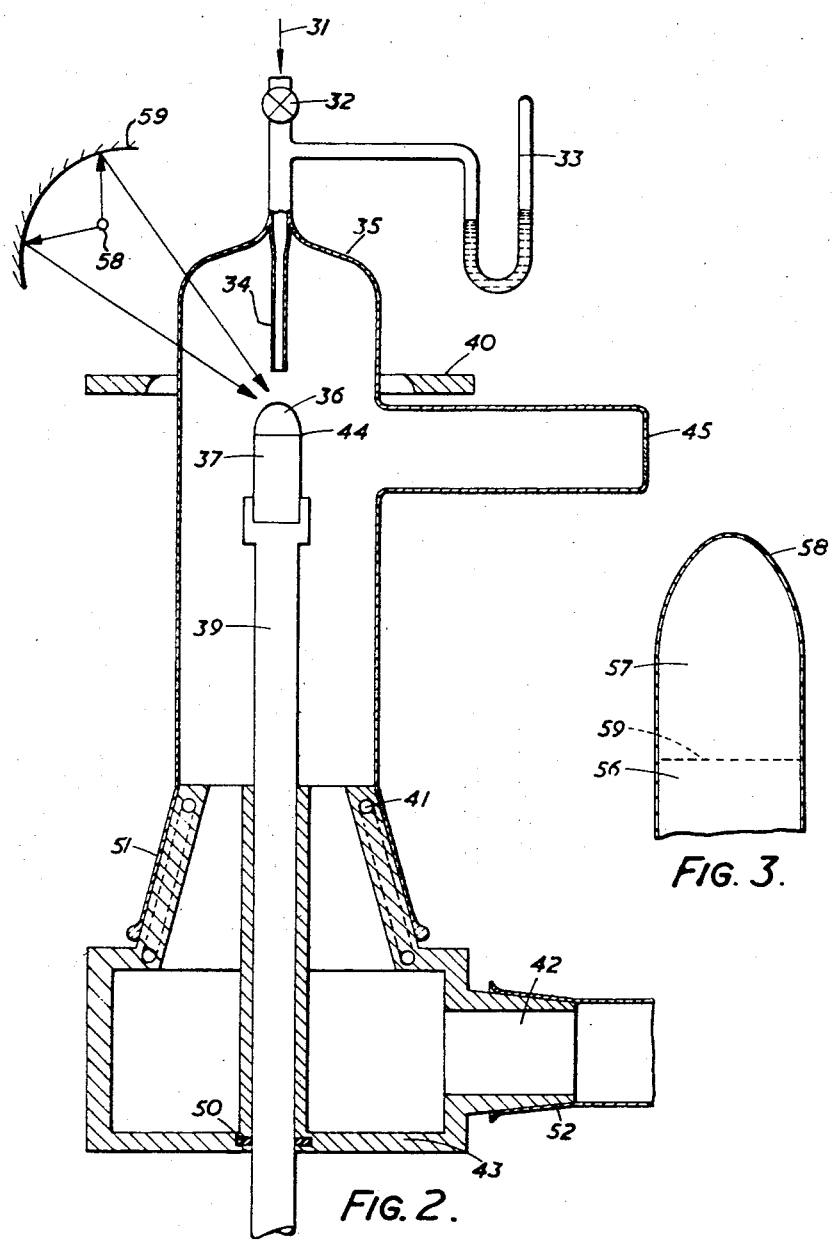

3,006,734
PROCESS FOR PREPARING PURE SILICON
Frederick C. Cowlard, Towcester, and Leighton G. Penhale, Northampton, England, assignors to The Plessey Company Limited, Ilford, England, a British company
Filed Nov. 14, 1957, Ser. No. 696,567
2 Claims. (Cl. 23—223.5)

This invention relates to processes for the manufacture of semi-conductor materials.

Semi-conductor materials for use in rectifiers, transistors and the like are required to be prepared to exceptional standards, in that the material must have an impurity content which is exceedingly low by ordinary standards.

The preparation of semi-conductor material to these requirements is a problem of considerable technical difficulty, and the present invention is concerned with the provision of a process by which a semi-conductor material of desired chemical composition can be obtained, and from or by which material of appropriate electrical properties can be obtained.

The semi-conductor material must include an additive the purpose of which is to produce the desired type and degree of conductivity in the semi-conductor. Such additives are also present in minute but precisely controlled quantities.

The semi-conductor material of desired conductivity can be obtained by first preparing the pure material, to a degree of purity greater than that of the final material, and incorporating the additives. The invention can be used to produce semi-conductor material of a degree of purity appropriate for this use.

The invention can also be used in connection with the production of a semi-conductor material, with appropriate additives, directly and without first preparing the pure semi-conductor material, as described in our co-pending application Serial No. 696,568, filed Nov. 14, 1957.

The present invention consists of a method for the preparation of highly pure semi-conductor material by the thermal decomposition of a gaseous compound of the material, which comprises raising the temperature of a body of the material by thermal radiation to a temperature sufficient to reduce the electrical resistivity of the material to a value at which its temperature can be at least maintained by induction heating and thereafter heating said material by induction heating to effect said decomposition in the vicinity of the heated material.

Other features and advantages of the invention will appear from the following description of an embodiment thereof, in conjunction with the drawings in which:

FIGURE 1 is a diagrammatic view of apparatus suited to one method of preparing pure silane, FIGURE 2 is a diagrammatic view of apparatus according to the invention, and FIGURE 3 is a section of silicon rod produced by the apparatus and process of the invention.

One method of producing pure silane will now be described with reference to FIGURE 1 of the drawings. Other methods of producing pure silane are known but we have found it convenient to use the action of ammonium bromide in liquid ammonia upon magnesium silicide.

Magnesium silicide is prepared by heating an intimate mixture of magnesium and commercial grade silicon powder, preferably in the atomic ratio of 2Mg.Si, in an atmosphere of hydrogen. The magnesium silicide so prepared is reacted with a solution of ammonuim bromide in liquid ammonia when a high yield (up to 75%) of the monosilane $SiH_4$ is produced. Only a very small percentage of the higher hydrides of silicon $Si_2H_6$, $Si_3H_8$, etc., are present in the gas produced and these may be rejected without greatly affecting the final yield of silicon. The monosilane or silane produced by the above reaction must be further purified before it can be used for obtaining pure silicon according to the invention.

The reaction between magnesium silicide and ammonium bromide may be carried out in that part of the apparatus shown to the left of the vertical broken line in FIGURE 1, whilst purification is carried out in the apparatus shown to the right of this line. The reaction apparatus is made of borosilicate glass and the purification apparatus of quartz. The solution of ammonium bromide in liquid ammonia is placed in the round bottomed flask 1 which is surrounded by a low temperature bath 2 maintained at about −50° C. The magnesium silicide is contained in two side tubes 3 which are secured in necks on the round bottomed flask 1 by means of ground glass joints. By rotating the side tubes 3 the powdered magnesium silicide can be tipped into the solution of ammonium bromide as required. Connected to the flask 1 is a valve controlled inlet 4 for the liquid ammonia and a dephlegmator 5 for refluxing most of the ammonia vapourised by the reaction. The ammonia is condensed in the tubes 6 which are surrounded by a mixture 7 of solid carbon dioxide and acetone refrigerant.

The condenser tubes 6 are connected to a heat exchanging unit 8 which serves to remove most or all residual ammonia from the gas. The heat exchanger 8 contains a coil 9 through which a refrigerant consisting of gaseous nitrogen cooled by liquid nitrogen is passed. On coming into contact with the coil 9 the gas stream is cooled to about −100° C. and most of all residual ammonia removed. The outlet tube 10 of the heat exchanger is connected by means of borosilicate glass to quartz joint 11 to the boiler tube 12 of the purification apparatus. The boiler tube 12, which is surrounded by a suitable low-temperature bath 13 (about −130° C.) is connected to a vacuum jacketed fractionating column 14. The fractionating column 14 is packed with small quartz spirals and terminates in a condenser 15 cooled by liquid nitrogen. Heat leakages into the column 14 from the atmosphere are offset by passing the cold nitrogen gas evaporating from the condenser 15 down between the packed column 14 and the vacuum jacket 16. A tube 17 for leading the gas from the fractionating column 14 is connected to a flow gauge 18 and to quartz filters 19 and 20. The quartz filter 19 comprises a U-tube containing quartz wool immersed in a low temperature bath at about −78°. The quartz filter 20 comprises a quartz filter disc. The outlet 21 from the purification apparatus leads to the apparatus for the production of pure silicon.

Various flow control taps such as 22, are provided where required and also manometers such as 23 are connected to those points on the apparatus where a check on the pressure is required. By means of a tube 24 a diffusion pump can be connected to the apparatus to enable the whole to be evacuated.

Before the reaction between the solution of ammonium bromide in ammonia and magnesium silicide is commenced, the whole apparatus is evacuated in order to prevent oxidation of the silane produced; such oxidation takes place spontaneously in air and with some considerable violence at ordinary temperatures and pressures. When the apparatus has been evacuated the tubes 3 are tilted to tip some of the magnesium silicide into the solution of ammonium bromide whereupon a gas containing monosilane, ammonia, hydrogen and small amounts of other hydrides is evolved. Most of the ammonia is refluxed by the dephlegmator 5 above the reaction vessel 1 and most of the residual ammonia removed by the heat exchanger 8. The silane flowing in the tube 10 is then condensed in the boiler 12 of the purification apparatus. For this the boiler tube is surrounded by a bath containing liquid nitrogen of boiling point −196° C; to start the distillation this bath is replaced by another kept at a temperature of about −120° C. The hydrogen present is pumped away by means of the tube 24 connected to the diffusion pump through a tubular furnace, to decompose any non-condensed silane in the hydrogen stream. The liquid silane in the boiler 12 is caused to evaporate by the heat from the low temperature bath 13 and condenses in the condenser 15 at the top of the fractionating column 14.

The liquid silane condensed in the condenser 15 refluxes back onto the packing in the fractionating column 14 and gradually cools and wets the latter until the whole packing is thoroughly wetted and liquid silane is refluxing into the boiler 12. After allowing a suitable time for a steady state to be reached, the distillate is removed from the top of the fractionating column 14 by means of the tube 17, the pure silane then being led through the flow gauge 18 and the quartz filters 19 and 20 to the outlet 21 and thence to the decomposition cell for the production of pure silicon.

Referring to FIGURE 2, the apparatus shown is designed for carrying out the thermal decomposition of monosilane (or silane) into its constituents, silicon and hydrogen, at temperatures above about 450° C. This thermal decomposition may take place either at a hot surface or in the gas phase and both reactions can occur simultaneously. Conditions are chosen in the apparatus to be described such that the surface decomposition of silane is favoured. Apparatus which is better suited to the decomposition of silane in the gas phase forms the subject matter of our co-pending application Serial No. 696,566, filed Nov. 14, 1957, now U.S. Patent 2,993,763, issued July 25, 1961.

In the apparatus of FIGURE 2, a supply of silane 31, purified either by the fractional distillation method described or by a gas chromatographic method, or any other suitable method of purification, is led via a control tap 32 and a manometer 33 to a quartz decomposition chamber 35. The silane enters the chamber 35 through a suitably designed quartz jet tube 34 and impinges onto a globule 36 of liquid silicon which is held stable at the top of a high purity silicon seed crystal 37 having a resistivity of at least 50 ohm-cm. In operation during the formation of pure silicon the globule of silicon 36 is maintained in liquid form by means of a water cooled copper inductor loop 40 placed outside the chamber 5. This inductor loop 40 is supplied with high frequency alternating current from a suitably designed high power generator (not shown) the operating frequency being suitably between about 300 kc./s. and 1 mc./s.

The resistivity of the high purity silicon seed 7 is too high at room temperature for the initial heating of the seed by the high frequency inductor loop 40. Therefore, an initial temperature rise is created in the seed 37 in order to lower the resistivity and this may be brought about by focussing a high wattage electric lamp 58 on the seed 37 by means of an ellipsoidal mirror 59 or pair of parabolic mirrors. The rays of infra-red radiation are schematically represented by lines with arrow heads. Alternatively in order to effect the required initial temperature rise an annulus of any suitable high melting point metal, such as molybdenum tungsten etc. or high purity de-gassed graphite may be placed concentrically around the seed 37 such that it couples well with the inductor loop 40 and thus heats the seed by direct radiation to the required temperature, usually between 500 and 1000° C. When this temperature has been reached the annulus is quickly removed so that direct coupling may then exist tween the seed 37 and the inductor loop 40, and the seed remaining hot by absorbing the high frequency power from the loop. This later method however suffers from the disadvantage that materials are introduced into the chamber 35 which give off a vapour that may lead to an impurity being formed in the silicon. For this reason the elliptical mirror method is preferred as this avoids introducing foreign materials into the decomposition chamber.

Once preheating has been established, the high frequency power dissipation in the silicon seed 37 is greatly increased and the top of the seed forms into the molten globule 36. The design of the inductor loop 40 and position of the silicon seed 37 in the field of the loop are so arranged that it is possible to hold the liquid blob 36 stably on the top of the seed crystal. The shape of the liquid-solid interface 44 produced between the liquid blob 36 and the crystal 37 is in practice convex towards the liquid, which condition facilitates single crystal growth.

As during the process some silicon is deposited on the inner walls of the chamber 35, the chamber is provided with an extension window 45 which does not become so coated and which always provides a means of sighting the seed 37 and the liquid globule 36.

The position of the crystal seed 37 can be varied relative to the inductor loop 40 by means of the centreless ground quartz rod 39 to which the crystal seed 37 is secured by means of a quartz support 38. The quartz rod 39 is so mounted in a base 43 provided for the apparatus, that it can be rotated during the deposition of silicon, a seal being provided between the quartz rod 39 and the base 43 by means of a high vacuum rubber seal 50. Connection between the chamber 35 and the base 43 is provided by means of water cooled metal cone 41 which engages ground socket 51 on the chamber. The outlet 42 from the base 43 leads through a further metal-ground quartz joint 52 to a high vacuum pump for evacuating the apparatus, not shown.

Once the desired operating conditions for the apparatus have been attained the silane emerging from the jet tube 34 decomposes at the liquid silicon surface and the silicon so formed enters the liquid globule whilst the hydrogen is drawn off through the outlet 42 by means of the vacuum pump. As the deposited silicon enters the globule 36, the seed 37 is slowly rotated and withdrawn from the chamber at a rate equivalent to that at which silicon is deposited from the vapour phase so that the liquid-solid interface remains approximately stationary relative to the inductor loop 40. In this manner a continuous rod of densified silicon is built up on the seed crystal. If the seed crystal 37 is mono-crystalline then single crystal silicon is obtained from the material that solidifies from the liquid, whilst the use of a polycrystalline seed results in polycrystalline silicon but the orientation of the seed crystal grains is carried on throughout the material deposited in the liquid.

An extraneous polycrystalline over-growth is obtained as some silane decomposes on those parts of the seed 37 below the liquid-solid interface where the temperature is greater than 450° C. This extraneous over-growth also takes place at the liquid-solid interface, since any silane present there may decompose either on the liquid or the solid surface. However, this extraneous over-growth does not cause stray nucleation towards the centre of the seed because of the convexity of the liquid-solid interface towards the liquid which causes this over-growth to extend outwards from the seed 37.

This type of silicon build up obtained by the method and apparatus of this invention can be seen from FIGURE 3. In this figure an original seed crystal 56, in this case a single crystal, is shown together with a build up of deposited silicon material 57 which is also monocrystalline and of the same orientation as the seed crystal 56. An extraneous poly-crystalline over-growth is indicated at 58 as a thin crust around the silicon rod. The dotted line 59 shows the top of the original crystal seed 56.

In order to favour the decomposition of silane at the surface of the liquid globule 36 the decomposition is carried out at a reduced pressure. The control valve 32 is adjusted so that the silane pressure on the inlet side of the jet 34 is about 0.5 to 1.0 cms. of mercury, the chamber being continuously evacuated by means of the vacuum pump connected to the aperture 42 so that this jet pressure is maintained. Under these conditions a mass of from 1.5 to 5 grams of silicon per hour is deposited on the seed 37, the exact amount deposited depending on the exact value of the jet inlet pressure. It is found that the lower the jet inlet pressure the greater the proportion of surface decomposition to gas phase decomposition. Silicon produced in the gas phase decomposition is swept to the walls of the chamber 35 as an amorphous brown deposit which eventually obscures vision through the main part of the chamber.

Generally speaking we have found that the higher the jet inlet pressure the lower the proportion of surface decomposition to gas phase decomposition and the greater the deposition rate because the input rate of silane has increased. These observations apply essentially to low pressure conditions and experiments carried out on the decomposition of silane at 40 to 60 cms. Hg pressure when the proportion of surface decomposition to gas phase decomposition is very low, indicate that the rate of deposition on the seed 37 is negligible. The surface decomposition of silane is preferred in this invention but in order to attain a suitable production rate a compromise is made between those conditions which favour a gas phase decomposition and those which favour a surface decomposition and in practice silicon is deposited on the seed 37 at the rate of about 5 grams per hour, which corresponds roughly to a 1:1 ratio between surface and gas phase decomposition.

Variations and modifications of the invention may be made without departing from the scope thereof. Thus it should be emphasised that the deposition rates and reaction proportions mentioned above are dependent on the physical arrangement of the jet system in relation to the inductor loop, the position of the seed crystal and the design of the chamber.

What we claim is:

1. A method of producing highly pure silicon, comprising supporting a pure silicon seed crystal in an evacuated chamber; heating by thermal radiation a portion of said seed crystal, free of contact with other bodies, to a temperature at which the electrical resistance of said portion is responsive to inductive heating; inductively heating said portion to produce a surface of molten silicon; directing a stream of substantially pure silane through a restricted passageway against said surface; continuously rotating said seed crystal while moving it relative to the zone of inductive heating at a rate equivalent to that at which silicon is deposited on said crystal and continuously evacuating said chamber to maintain a pressure drop in said passageway of from about 0.5 to 1.0 cm. of mercury and establish a rate of flow of said stream to produce silicon both by gas phase decomposition of said silane and by decomposition of said silane at said surface and effect a build-up of 1.5 to 5 grams per hour of highly pure silicon upon said seed crystal.

2. A method as claimed in claim 1 in which said silicon is built up on said seed crystal at a rate of approximately 5 grams per hour.

References Cited in the file of this patent

UNITED STATES PATENTS

| | | |
|---|---|---|
| 2,792,317 | Davis | May 14, 1957 |
| 2,793,103 | Emeis | May 21, 1957 |
| 2,855,355 | Seiler et al. | Oct. 7, 1958 |

FOREIGN PATENTS

| | | |
|---|---|---|
| 745,698 | Great Britain | Feb. 29, 1956 |
| 1,125,277 | France | July 9, 1956 |